W. ANDERSON.
Harrow.
No 11,452.
Patented Aug. 1, 1854.
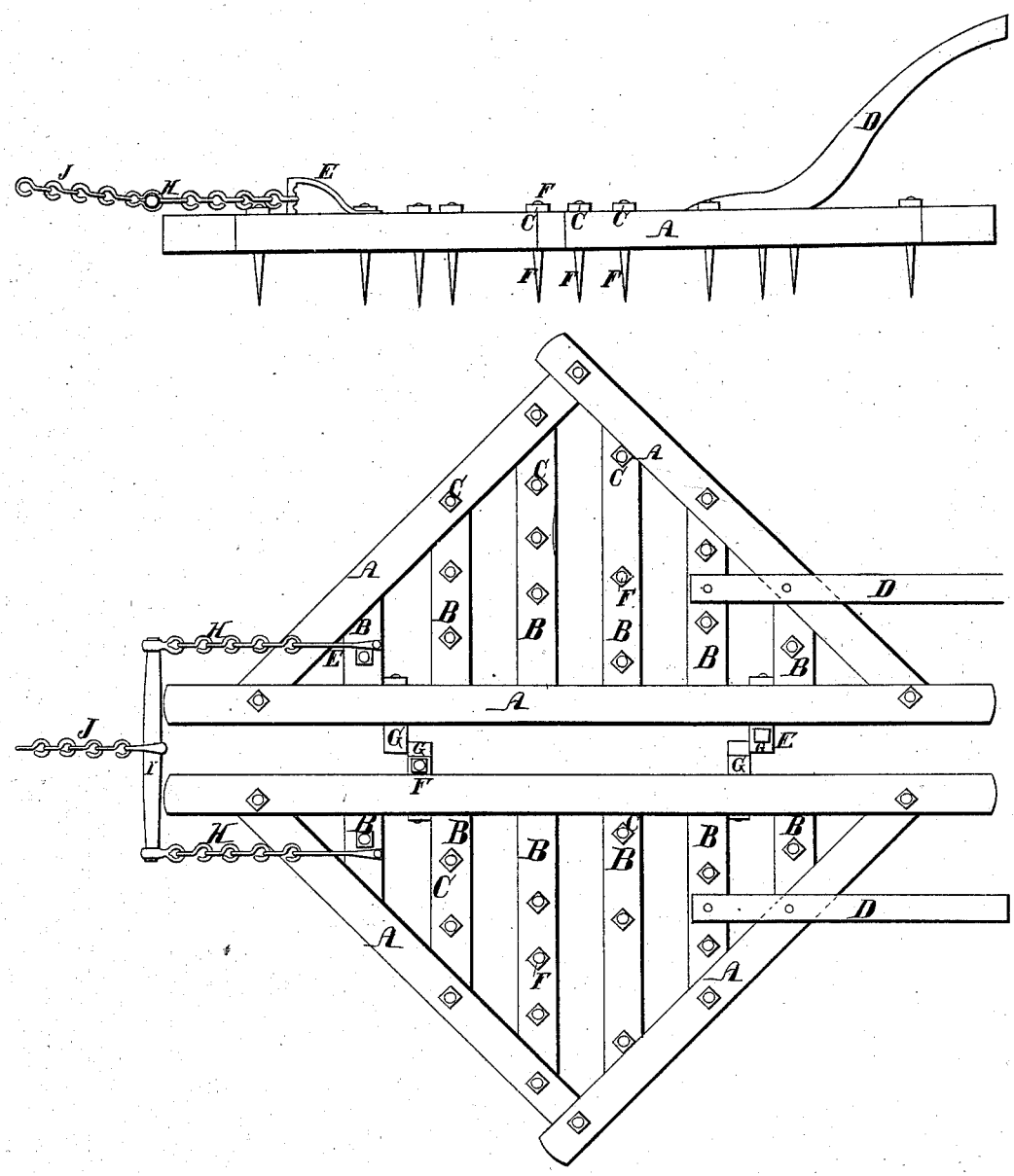

UNITED STATES PATENT OFFICE.

WILLIAM ANDERSON, OF JACKSONVILLE, NEW YORK.

IMPROVEMENT IN HARROWS.

Specification forming part of Letters Patent No. 11,452, dated August 1, 1854.

*To all whom it may concern:*

Be it known that I, WM. ANDERSON, of Jacksonville, in the county of Tompkins and State of New York, have invented a new and useful Improvement in Harrows; and I do hereby declare that the following is a full and exact description thereof, reference being had to the accompanying drawings, and to the letters of reference marked thereon.

Figure 1 is a bird's-eye view. Fig. 2 is a sectional view.

A A A is the frame, made of two right-angled triangles connected together by the hinges G G.

B B are string-pieces placed at right angles with the hypotenuse, through which and string-pieces the teeth F F are inserted. Teeth are also inserted in the frame A A and in the hinges G G.

C C are nuts securing the teeth F F in their places.

D D are handles for guiding and raising the harrow when it becomes necessary to turn one half of the harrow upon the other.

E E are draw-heads firmly affixed to a string-piece and frame two-sevenths from the center of each half of the harrow, with notches one above another, into one of which the chains H H are hooked.

I is a bar connecting the chains H H.

J is a chain by which the harrow is drawn.

What I claim as my invention, and desire to secure by Letters Patent, is—

Inserting a tooth in each hinge at G G, so that no part of the ground escapes being pulverized, whereas in other harrows with hinges a large space in the center of the harrow escapes.

WM. ANDERSON.

Witnesses:
   ROBT. CARTWRIGHT,
   ELIAS FREMAN.